US012386967B2

(12) United States Patent
Miller et al.

(10) Patent No.: US 12,386,967 B2
(45) Date of Patent: Aug. 12, 2025

(54) HASH LOOK-UP TABLE TO TRIAGE CATASTROPHIC SYSTEM FAILURES

(71) Applicant: DELL PRODUCTS L.P., Round Rock, TX (US)

(72) Inventors: Xiaomei Zhu Miller, Round Rock, TX (US); Adolfo S. Montero, Pflugerville, TX (US); Shekar Babu S, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 18/455,804

(22) Filed: Aug. 25, 2023

(65) Prior Publication Data

US 2025/0045406 A1  Feb. 6, 2025

(30) Foreign Application Priority Data

Aug. 2, 2023  (IN) .............................. 202311052040

(51) Int. Cl.
*G06F 21/57*  (2013.01)
(52) U.S. Cl.
CPC ................ *G06F 21/575* (2013.01)

(58) Field of Classification Search
CPC ...................................................... G06F 21/575
See application file for complete search history.

(56) References Cited

U.S. PATENT DOCUMENTS

| 6,625,730 | B1 | 9/2003 | Angelo et al. |
| 2002/0099949 | A1 | 7/2002 | Fries et al. |
| 2021/0344506 | A1* | 11/2021 | Wei ...................... G06F 21/6245 |
| 2021/0389958 | A1* | 12/2021 | Choi ...................... G06F 9/4416 |
| 2022/0058271 | A1* | 2/2022 | Rose ...................... G06F 9/4401 |
| 2022/0067167 | A1* | 3/2022 | Chen ...................... G06F 1/3225 |
| 2022/0083640 | A1* | 3/2022 | Duval ...................... G06F 21/64 |

* cited by examiner

*Primary Examiner* — Zahid Choudhury
(74) *Attorney, Agent, or Firm* — Larson Newman, LLP

(57) ABSTRACT

An information handling system includes a memory device and a BIOS. The memory device includes a location to store a path hash value. The BIOS executes a plurality of processes to boot the information handling system. Each process has a unique identifier (ID). When the BIOS executes a first process, the BIOS calculates a first hash value of a first ID of the first process and stores the first hash value in the location. Each time the BIOS executes a second process, the BIOS calculates a second hash value of the path hash value and a second ID of the second process and stores the second hash value in the location.

20 Claims, 3 Drawing Sheets

| | |
|---|---|
| P1 | HASH_01 |
| P1 + P2 | HASH_02 |
| P1 + P2 + P3 | HASH_03 |
| P1 + P2 + P3 + P4 | HASH_04 |
| P1 + P2 + P3 + P4 + P5 | HASH_05 |
| P1 + P2 + P3 + P4 + P5 + P6 | HASH_06 |
| P1 + P2 + P3 + P4 + P5 + P7    ▪ ▪ ▪ | HASH_xx |
| P1 + P2 + P3 + P4 + P8 | HASH_07 |
| P1 + P2 + P3 + P4 + P8 + P10 | HASH_08 |
| P1 + P2 + P3 + P4 + P8 + P10 + P14 | HASH_09 |
| P1 + P2 + P3 + P4 + P8 + P10 + P16    ▪ ▪ ▪ | HASH_yy |
| P1 + P2 + P3 + P4 + P8 + P10 + P14 + P19 | HASH_10 |
| P1 + P2 + P3 + P4 + P8 + P10 + P14 + P19 + P25 | HASH_11 |
| P1 + P2 + P3 + P4 + P8 + P10 + P14 + P19 + P25 + P26 | HASH_12 |
| P1 + P2 + P3 + P4 + P8 + P10 + P14 + P19 + P25 + P26 + P28 | HASH_13 |
| P1 + P2 + P3 + P4 + P8 + P10 + P14 + P19 + P25 + P26 + P28 + P29 | HASH_14 |

200

210

HASH LOOK-UP TABLE TO TRIAGE CATASTROPHIC SYSTEM FAILURES

CROSS-REFERENCE TO RELATED APPLICATION

Related subject matter is contained in co-pending U.S. patent application Ser. No. 18/455,852 entitled "UTILIZING A HASH OF A BOOT PATH AS INDICATION OF A SECURE BOOT FLOW," filed Aug. 25, 2023, the disclosure of which is hereby incorporated by reference.

FIELD OF THE DISCLOSURE

This disclosure generally relates to information handling systems, and more particularly relates to providing a hash look-up table to triage catastrophic system failures.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory device and a BIOS. The memory device includes a location to store a path hash value. The BIOS may execute a plurality of processes to boot the information handling system. Each process may have a unique identifier (ID). When the BIOS executes a first process, the BIOS may calculate a first hash value of a first ID of the first process and store the first hash value in the location. Each time the BIOS executes a second process, the BIOS may calculate a second hash value of the path hash value and a second ID of the second process and store the second hash value in the location.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
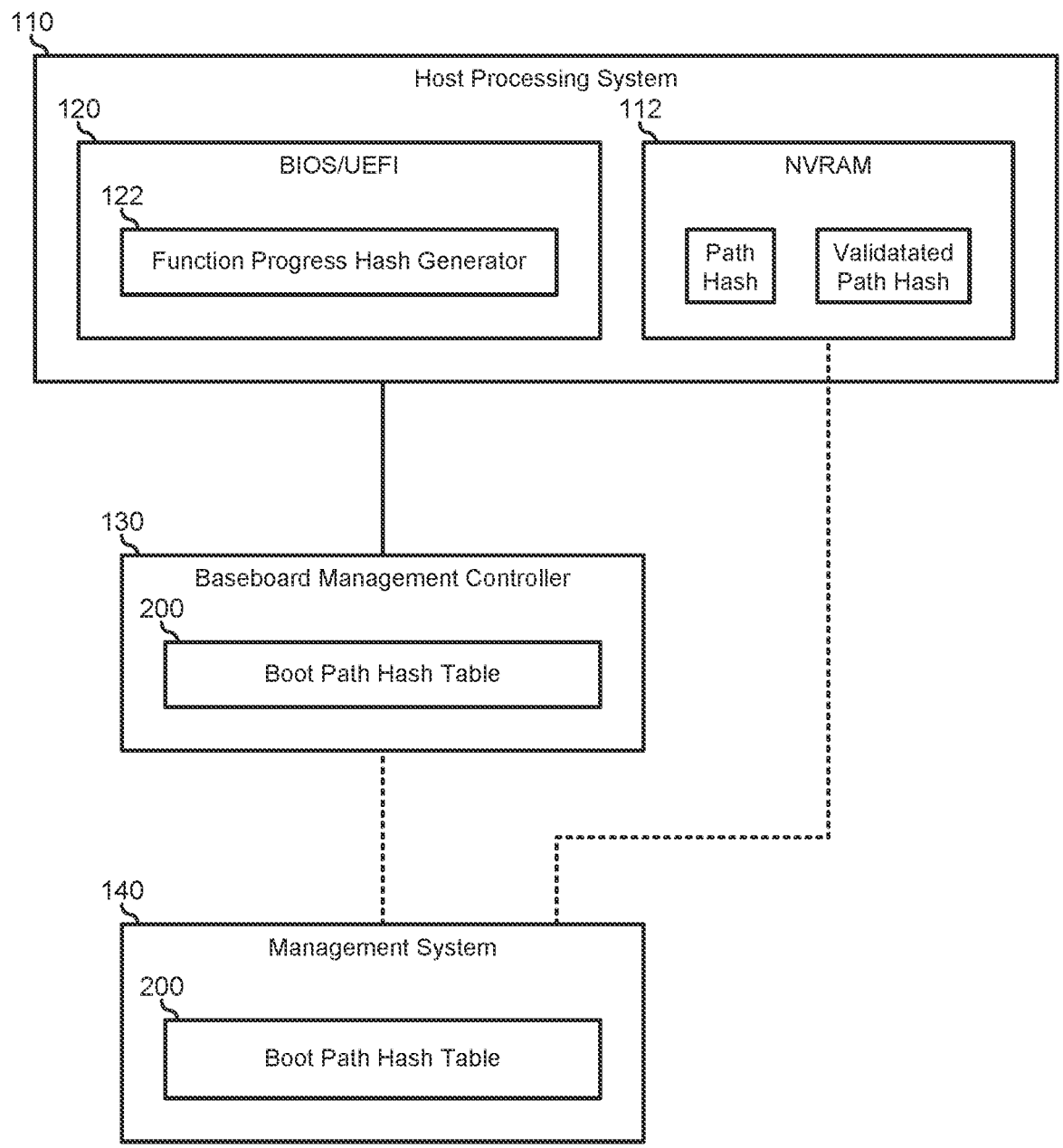
FIG. 1 is a block diagram of an information handling system according to an embodiment of the current disclosure.
Figure 3:
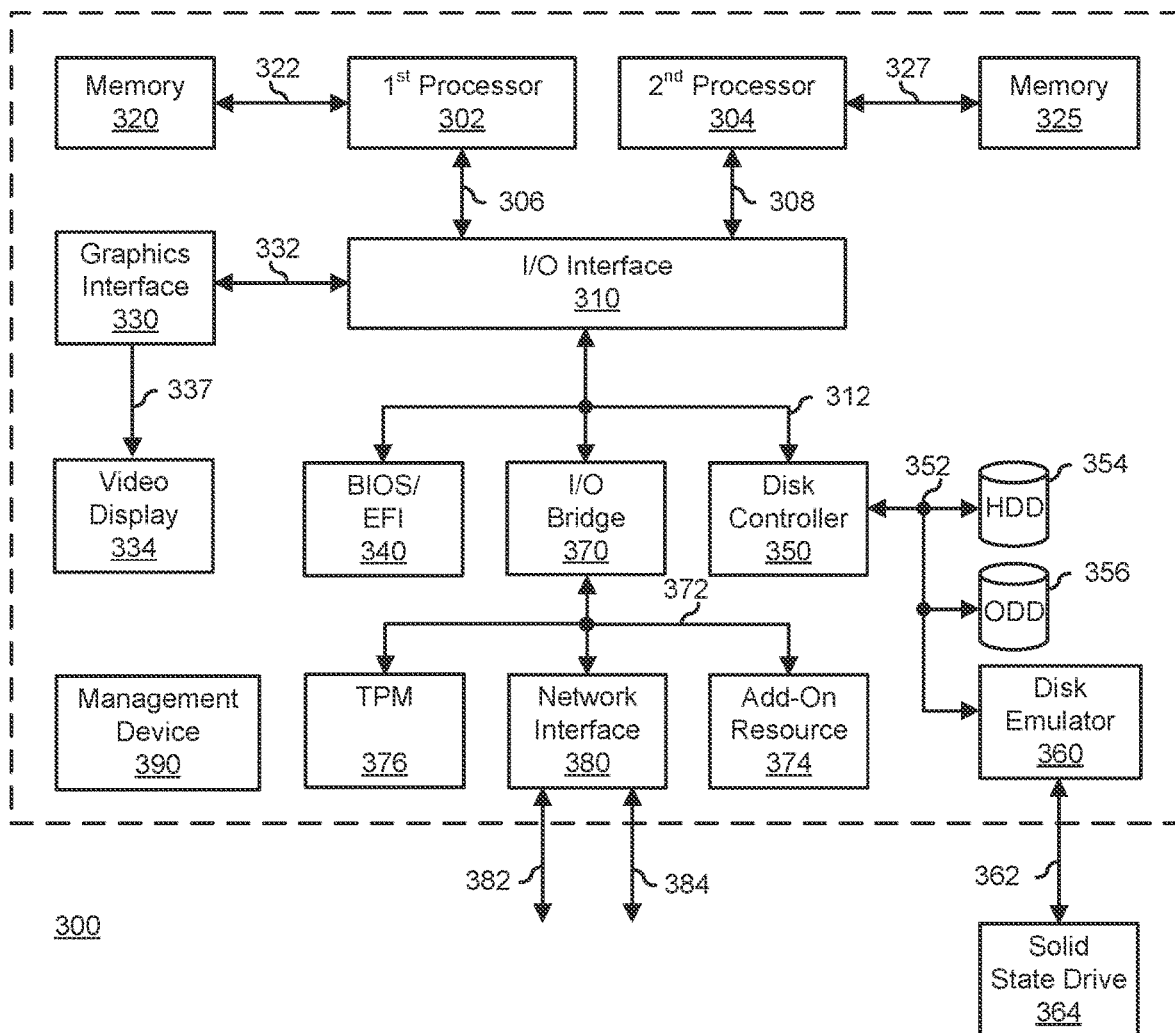
FIG. 3 is a block diagram illustrating a generalized information handling system according to another embodiment of the present disclosure.

FIG. 1 illustrates an information handling system 100, including a host processing system 110 and a baseboard management controller (BMC) 130. Information handling system 100 is similar to information handling system 300, as shown in FIG. 3 below. Host processing system 110 represents the elements of information handling system 100 that are typically associated with the operations for which the information handling system is utilized. As such, host processing system 110 may represent the hardware and firmware elements of information handling system 100, such as processors, memory, I/O hubs, storage devices, human interface devices, and the like. A Basic Input/Output System (BIOS)/Universal Extensible Firmware Interface (UEFI) 120 is instantiated in host processing system 110. BIOS/UEFI 120 operates during a system boot phase of operation of information handling system 100 to initialize the hardware and firmware elements of host processing system 110 and to launch an operating system on the host processing system, as described further below. During a run time phase of operation, BIOS/UEFI 120 operates to monitor, manage, and maintain low-level operations of the host processing system, as needed or desired.

BMC 130 represents a separate processing system implemented on information handling system 100 to monitor, manage, and maintain the operations of host processing system 110 and other non-processing related activities of the information handling system, such as thermal and power management, firmware updates, and the like. As such, BMC 130 operates out-of-band from the processing environment of host processing system 110. Host processing system 110 includes a non-volatile random access memory (NVRAM) 112 that stores data non-volatilely, that is, the data stored thereon remains when the host processing system is powered off. BMC 130, while not explicitly a part of host processing system 110, has access to the contents of NVRAM 112 to retrieve data stored thereon, as described further below.

As noted above, BIOS/UEFI 120 operates during the system boot phase to initialize the hardware and firmware elements of host processing system 110 and to launch an operating system on the host processing system. It will be understood that such a system boot activities may be performed as a large number of separate processes, each related to a different hardware or firmware element of information handling system 100. In some cases, the order of processing of the various processes may be key to the successful boot, for example, when a parameter that is set up by a first boot process is necessary for the successful completion of a second boot process, or when a particular parameter may be set up in one way to facilitate the system boot process but may need to be sit up in a different way during run time operation. Moreover, the boot process flow, that is, the order in which the boot processes are executed, may vary from one instance of the system boot phase to the next, due to unexpected machine state information remaining intact through the reboot process.

Typically, such variations and dependencies in the system boot phase are opaque to the user of the information handling system, and there is little ability to track the individual boot processes as they are being executed. BIOS/UEFI 120 may include various mechanisms to facilitate the tracking of the system boot phase. For example, BIOS/UEFI 120 may have an option to view a command line display of the activities being performed during the system boot phase. However, such indications as to the progress of the system boot phase are typically on the level of displaying which executables were launched, and do not provide a finer grained view into the specific processes being performed. For example, it may be determinable that memory reference code has begun to be executed, and that the memory reference code was completed successfully. However, memory reference code will be understood to include multiple different processes, and such command line displays do not typically display such a level of detail.

Moreover, there are many instances where the system boot phase experiences a failure to successfully execute a particular boot process. Here, BIOS/UEFI 120 may provide various "beep" codes or light indicators (LED codes) that provide a very coarse indication of the type of failure experienced. For example, a short beep may indicate a memory circuit fault, but gives no more detailed information than that. Further, the reliance on such beep/LED codes is dependent upon the level of fault tolerance built into BIOS/UEFI, and can only identify particular predetermined conditions. Such a fault detection scheme does not permit the rapid debugging of system boot failures in a rapidly changing environment. Moreover, many system boot phase failures may result in a complete halting of code execution by the processor, leaving the user with nothing but a blank screen and no indication as to the cause of the system boot phase failure.

A typical method to debug such system boot phase failures is to single-step through the BIOS/UEFI code to determine where the fault occurs. However, such an approach is very time consuming and often necessitates the user relinquishing their information handling system to a service technician for extended periods of time to get to the root cause. The difficulty in debugging system boot phase failures is such that even highly trained technicians often resort to the rote replacement of parts to see which one fixes the problem. Such an approach is expensive and time consuming for the support provider, and highly unsatisfactory to the end user.

In a particular embodiment, each system boot process, including programs, executables, sub-routines, function calls, or the like, are provided with a unique identifier. BIOS/UEFI 120 includes a function progress hash generator 122 that operates to create and maintain a path hash for the processes executed during the system boot phase. In particular, when a system boot phase is initiated, a first process with a first process ID is invoked for execution, and function progress hash generator 122 initiates the path hash by creating a hash value of the first process ID. Then, when a next process is invoked, such as when a second process is called for execution, function progress hash generator 122 operates to create a new hash value from the prior path hash and the second process ID. By repeating this process for each invoked process in the system boot phase, a running hash of all of the processes is created as the processes are executed. In a particular embodiment, as the path hash is created and modified, the updated path hash is stored to NVRAM 112. In this way, a unique hash value can be derived for every possible combination of code flows through the system boot process. An example of a hash algorithm whereby function progress hash generator 122 creates a hash may include a Message Digest hash algorithm such as a MD5 algorithm, a Secure Hash Algorithm such as a SHA-1, SHA-2, SHA-3, or SHA-256 algorithm, or another hash algorithm, as needed or desired.

Figure 2:
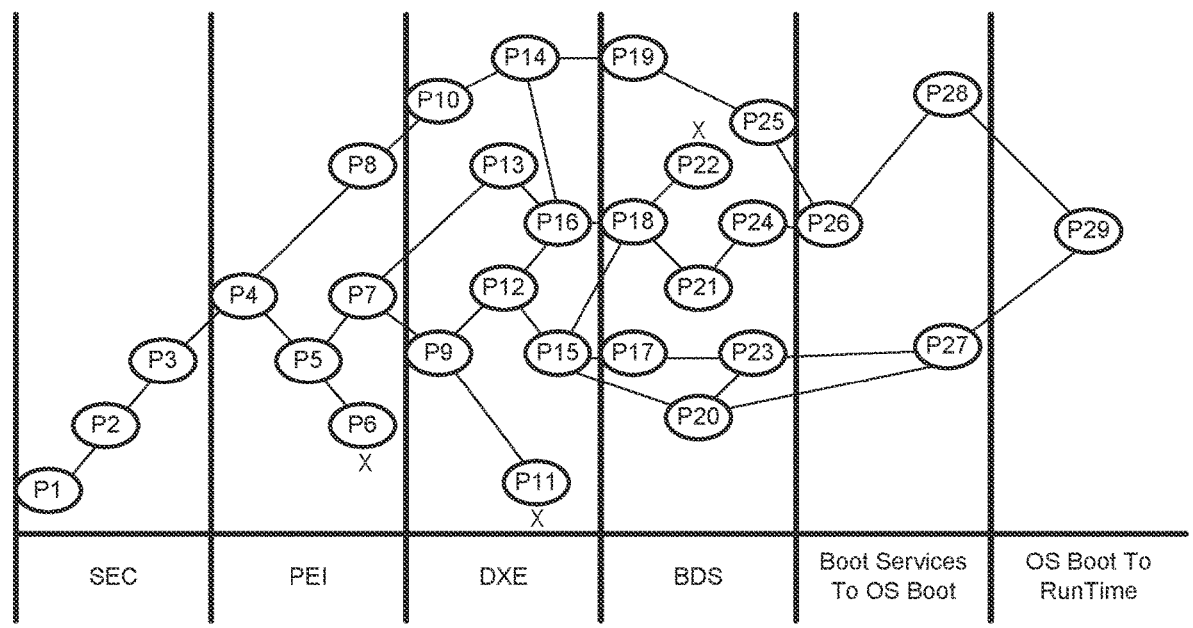
FIG. 2 illustrates a boot path hash table that is derived from analysis of a boot progress tree according to an embodiment of the current disclosure.

In conjunction with the creation and maintenance of the path hash each time information handling system 100 experiences a system boot process, an off-host process is performed to create a boot path hash table. FIG. 2 illustrates the creation of a boot path hash table 200 through the analysis of a boot progress tree 210. Here, the boot process is illustrated as a UEFI process with a SEC phase, a PEI phase, a DXE phase, a BDS phase, a boot-service-to-OS-boot phase, and an OS-boot-to-runtime phase. The details of a UEFI boot process are known in the art and will not be further described herein, except as may be needed to illustrate the current embodiments. Boot progress tree 210 includes a number of processes (P1-P29) that are possible to be executed during the system boot phase of a particular type of information handling systems. In particular, each one of processes (P1-P29) are characterized by the processes by which they are invoked and the processes which are invoked thereby.

For example, during the SEC phase, an initial process P1 represents a process with a first process ID. A hash (HASH_01) of the initial process P1 is created and stored in an entry of boot path hash table 200 that is associated with a boot path that exclusively includes the execution of the initial process P1. The initial process P1 can be determined to exclusively call a second process P2, and so a boot path including the execution of process P1 followed by process P2 (P1+P2) is created, and a hash (HASH_02) is created and stored in the associated entry of boot path hash table 200. Similar entries are create for boot path "P1_P2_P3" (HASH_03), and for boot path "P1+P2+P3+P4" (HASH_04). At the fourth process P4, the code execution is determined to be able to split into two different flows: to a fifth process P5 and to an eighth process P8. Without going into further detailed descriptions of the additional entries to boot path hash table 200, it will be understood that every possible boot path, whether terminating in an abrupt end to the system boot process (e.g., in processes P6, P11, and P22), or terminating in the successful launch of a run time OS (e.g., in process P29), is mapped to an associated entry in the boot path hash table with their associated hash values.

The generation of boot path hash table 200, and the associated analysis of boot progress tree 210 may be performed off-host from information handling system 100. In particular, a manufacturer of information handling systems may generate a boot path hash table for the information handling systems that they manufacture. As such, boot path hash table 200 can be utilized in conjunction with a support service provided by the manufacturer. Here, when a user has an information handling system, such as information handling system 100, that fails to boot, the user can contact the support service, and a service technician can access the path hash stored in NVRAM 112. In this case, BMC 130 is connected to a management system 140 associated with the support service and which includes boot path hash table 200. Then, by comparing the received path hash for information handling system 100, the technician can rapidly determine the precise boot path taken by the information handling system by comparing the path hash with the matching entry of boot path hash table 200. In this way, the typical first step in a debug process, finding out where the problem occurred, is rapidly performed, greatly increasing user satisfaction and reducing the time and cost of system debug.

In a particular embodiment, a copy of boot path hash table 200 is provided to BMC 130, and the failure analysis as described above can be performed within information handling system 100, as needed or desired. For example, while it may be understood that boot path hash table 200 may likely be a large data object 10's or 100's of gigabytes (GB)), it may be desirable in a development or debug setting to store such a large data object directly on information handling system 100 to mitigate any need to access off-system resources to debug boot failures. In particular, a debug tool may be provided that permits a user to terminal into BMC 130, to retrieve the path hash value from NVRAM 112, and to utilized the copy of boot path hash table 200 within BMC 130 to evaluate the boot failure as described above. It will be understood that a copy of boot path hash table 200 may be stored elsewhere on information handling system 100, as needed or desired.

The path analysis of boot progress path tree 210 may be performed by any path analysis algorithm as needed or desired. Note that such an analysis may not necessitate the actual execution of the code associated with all of the paths, as code analysis tools, such as a Coverity static code analysis tool, exist that can rapidly define all code flows, for example by detecting function calls, identifying branches associated with IF-THEN-ELSE code flows, or the like. Further, the analysis of boot path progress tree 210 may be performed during a design phase for information handling system 100, or can be modified as new possible code flows are identified, such as when firmware versions are spun.

In another embodiment, information handling system 100 utilizes the path hash from a completely successful system boot process to validate whether or not a particular desired boot path was taken to achieve the successful system boot process. For example, for the sake of platform security, it may be desirable to ensure that only known and trusted boot processes are executed, that no untrusted boot processes are executed, and that the trusted boot processes are executed in a known and trusted order. In this case, a path hash for the validated system boot process is generated and is stored in NVRAM 112. In a first case, the validated path hash is provided by a manufacturer of information handling system 100, which may be derived during a validation activity for the particular type of information handling system 100. In another case, BIOS.UEFI 120 operates to perform a system boot process that is taken as the baseline system boot process, generates the validated path hash for that baseline system boot process, and stores the validated path hash to NVRAM 112. In this case, a user of information handling system 100 may be given the choice to modify or update the validated path hash in order to capture user changes to the boot flow or as otherwise needed or desired.

Then, when information handling system 100 is successfully booted, BIOS/UEFI 120 operates to compare the calculated path hash for the successful system boot process with the validated path hash. If the path hash for the successful system boot process matches the validated path hash, then the system boot process will be understood to have followed the validated boot path, and control of information handling system 100 can be handed over to the OS. On the other hand, if the path hash does not match the validated path hash, then the system boot process will be understood to have followed a deviant boot path from the validated boot path, and an indication can be provided to the user that information handling system 100 is not in a validated state, BIOS/UEFI 120 can prevent the hand off to the OS, or other actions can be taken to ensure the valid operating state of the information handling system, as needed or desired.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 2394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a memory device including a location to store a path hash value; and
a Basic Input/Output System (BIOS) configured to execute a plurality of processes of a boot sequence to boot the information handling system, each process having a unique identifier (ID), wherein, when the BIOS executes a first process of the boot sequence, the BIOS calculates a first hash value of a first ID of the first process and stores the first hash value in the location, and, each time the BIOS executes a subsequent process of the boot sequence, the BIOS calculates a second hash value of the path hash value and a second ID of the subsequent process and stores the second hash value in the location.

2. The information handling system of claim 1, wherein, after the boot of the information handling system is completed, the path hash value identifies a boot path of the processes for the boot of the information handling system.

3. The information handling system of claim 2, wherein the boot of the information handling system is an unsuccessful boot of the information handling system.

4. The information handling system of claim 3, wherein the information handling system stores a boot path hash table that stores a unique boot path hash value for all possible paths of the processes for the boot of the information handling system.

5. The information handling system of claim 4, wherein the boot path is determined based on the boot path hash table.

6. The information handling system of claim 5, wherein the boot path is further determined by comparing the path hash value with the entries of the boot path hash table.

7. The information handling system of claim 6, wherein the boot path is encoded in a matching entry of the boot path hash table.

8. The information handling system of claim 4, wherein the boot path hash table is determined based upon an analysis of a boot path tree of the processes.

9. The information handling system of claim 2, wherein the boot of the information handling system is a successful boot of the information handling system.

10. The information handling system of claim 1, wherein the BIOS performs the hashing based upon one of a MD5 algorithm, a SHA-1 algorithm, a SHA-2 algorithm, SHA-3, and a SHA-256 algorithm.

11. A method, comprising:
providing, in a memory device of an information handling system, a location to store a path hash value;
executing, by a Basic Input/Output System (BIOS) of the information handling system, a plurality of processes of a boot sequence to boot the information handling system, each process having a unique identifier (ID);
when the BIOS executes a first process of the boot sequence:
calculating a first hash value of a first ID of the first process; and
storing the first hash value in the location; and
each time the BIOS executes a subsequent process of the boot sequence;
calculating a second hash value of the path hash value and a second ID of the subsequent process; and
storing the second hash value in the location.

12. The method of claim 11, wherein, after the boot of the information handling system is completed, the path hash value identifies a boot path of the processes for the boot of the information handling system.

13. The method of claim 12, wherein the boot of the information handling system is an unsuccessful boot of the information handling system.

14. The method of claim 13, wherein the information handling system stores a boot path hash table that stores a unique boot path hash value for all possible paths of the processes for the boot of the information handling system.

15. The method of claim 14, wherein the boot path is determined based on the boot path hash table.

16. The method of claim 15, wherein the boot path is further determined by comparing the path hash value with the entries of the boot path hash table.

17. The method of claim 16, wherein the boot path is encoded in a matching entry of the boot path hash table.

18. The method of claim 14, wherein the boot path hash table is determined based upon an analysis of a boot path tree of the processes.

19. The method of claim 12, wherein the boot of the information handling system is a successful boot of the information handling system.

20. An information handling system, comprising:
a memory device including a location to store a path hash value; and
a Basic Input/Output System (BIOS) configured to execute a plurality of processes of a boot sequence to boot the information handling system, each process having a unique identifier (ID), wherein, when the BIOS executes a first process, the BIOS calculates a first hash value of a first ID of the first process and stores the first hash value in the location, and, each time the BIOS executes a subsequent process of the boot sequence, the BIOS calculates a second hash value of the path hash value and a second ID of the subsequent process of the boot sequence and stores the second hash value in the location;
wherein, when the boot of the information handling system was an unsuccessful boot, a particular process is identified as a last process in the boot path based upon the path hash value.

* * * * *